United States Patent
Sunagawa et al.

(10) Patent No.: US 6,716,556 B2
(45) Date of Patent: Apr. 6, 2004

(54) NONAQUEOUS ELECTROLYTE RECHARGEABLE BATTERY

(75) Inventors: Takuya Sunagawa, Sumoto (JP); Yoichi Domoto, Ikoma (JP); Ryuji Ohshita, Neyagawa (JP); Hisaki Tarui, Shijyonawate (JP); Shin Fujitani, Hirakata (JP); Ikuo Yonezu, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 214 days.

(21) Appl. No.: 09/897,758

(22) Filed: Jul. 3, 2001

(65) Prior Publication Data

US 2002/0028382 A1 Mar. 7, 2002

(30) Foreign Application Priority Data

Jul. 4, 2000 (JP) .......................... 2000-202576

(51) Int. Cl.⁷ ............................. H01M 4/48; H01M 4/66
(52) U.S. Cl. ..................... 429/231.5; 429/233; 429/245
(58) Field of Search .......................... 429/231.1, 218.1, 429/231.5, 231.95, 233, 245; 252/182.1

(56) References Cited

U.S. PATENT DOCUMENTS

| | | | | |
|---|---|---|---|---|
| 3,808,052 A | * | 4/1974 | Dey | 429/337 |
| 3,915,740 A | * | 10/1975 | Eisenberg | 429/231.5 |
| 5,462,820 A | * | 10/1995 | Tanaka | 429/174 |
| 5,514,492 A | * | 5/1996 | Marincic et al. | 429/217 |
| 6,051,340 A | * | 4/2000 | Kawakami et al. | 429/231.95 |
| 6,291,100 B1 | * | 9/2001 | Doddapaneni et al. | 429/218.1 |
| 6,346,348 B1 | * | 2/2002 | Nakajima et al. | 429/231.5 |
| 6,391,496 B1 | * | 5/2002 | Nakajima et al. | 429/231.5 |

FOREIGN PATENT DOCUMENTS

| | | | |
|---|---|---|---|
| JP | 3-88269 A | 4/1991 | |
| JP | 06-333563 | * 12/1994 | H01M/4/58 |
| JP | 11-250907 A | 9/1999 | |

OTHER PUBLICATIONS

Julien, C. et al.; "Influence of the Growth Conditions on Electrochemical Features of $MoO_3$ Film–Cathodes in Lithium Microbatteries"; *Solid State Ionics*; vol. 73, pp. 319–326; 1994, no month.

Tsumura, T. et al., "Lithium Insertion/Extraction Reaction on Crystalline $MoO_3$"; *Solid State Ionics*; vol. 104, pp. 183–189; 1997, no month.

* cited by examiner

*Primary Examiner*—Patrick Ryan
*Assistant Examiner*—Tracy Dove
(74) *Attorney, Agent, or Firm*—Kubovcik & Kubovcik

(57) ABSTRACT

A nonaqueous electrolyte rechargeable battery including a positive electrode comprising a molybdenum metal oxide deposited, in the form of a thin film, on an aluminum-containing substrate and represented by the formula $Mo_{1-x}M_xO_{2+y}$ (where M is at least one element selected from the group consisting of Ni, Co, Mn, Fe, Cu, Al, Mg, W, Sc, Ti, Zn, Ga, Ge, Nb, Rh, Pd and Sn, x satisfies the relationship $0.005 \leq x \leq 0.5$, and y satisfies the relationship $0.6 \leq y \leq 1.2$).

11 Claims, 2 Drawing Sheets

NONAQUEOUS ELECTROLYTE RECHARGEABLE BATTERY

BACKGROUND OF THE INVENTION

1. Field of the Invention

The present invention relates to a nonaqueous electrolyte rechargeable battery including a positive electrode, a negative electrode and a nonaqueous electrolyte, and more particularly to a nonaqueous electrolyte rechargeable battery using molybdenum oxide for positive electrode material.

2. Description of Related Art

Currently available rechargeable lithium batteries use lithium cobaltate ($LiCoO_2$) or lithium manganate ($LiMn_2O_4$) for the positive electrode material and carbon materials for the negative electrode material. However, applications such as portable equipment demand rechargeable batteries capable of longer operation and thus having increased capacities and energy densities. Also, there has been a need in the art for alternative materials to lithium cobaltate which is a rare and expensive resource while being the most popular positive electrode material currently used.

Molybdenum oxide is considered to be a possible alternative to lithium cobaltate. In lithium cobaltate, an oxidation number of cobalt changes from trivalent to tetra-valent. An oxidation number of molybdenum, on the other hand, is changeable between tetravalent and hexavalent in molybdenum oxide. Accordingly, the use of molybdenum oxide in place of lithium cobaltate is expected to increase both capacities and energy densities of rechargeable batteries.

However, in the current state of the art, rechargeable lithium batteries using molybdenum oxide in place of lithium cobaltate only present the discharge capacity lower than the theoretical capacity. Japanese Patent Laying-Open Nos. Hei 11-250907 and Hei 3-88269 propose the use of molybdenum oxide in the amorphous form. However, resulting capacity and energy density have been still insufficient.

Also, it is known that when Li ions are inserted into molybdenum oxide, such Li ions move into spaces between layers composed of Mo and O and further into interiors of those layers to destruct them (See, for example, T. Tsumura and M. Inagaki, Solid State Ionics, vol.104 (1997), pp 183–189). This is considered due to the weak bond of Mo and O and has caused a problem of capacity decline with cycling for nonaqueous electrolyte rechargeable batteries using conventional molybdenum oxide for the positive electrode material. Since such a declining capacity with cycling is attributed basically to the weak bond between Mo and O the use of molybdenum oxide having an amorphous or other non-laminar crystal structure has also resulted in the capacity reduction with cycling.

SUMMARY OF THE INVENTION

It is an object of the present invention to provide a nonaqueous electrolyte rechargeable battery which uses molybdenum metal oxide for its positive electrode material, which has improved capacity and energy density and which exhibits excellent cycle performance characteristics.

The present invention provides a nonaqueous electrolyte rechargeable battery having a positive electrode, a negative electrode and a nonaqueous electrolyte. Characteristically, the positive electrode comprises molybdenum metal oxide deposited, in the form of a thin film, on an aluminum-containing substrate and represented by the formula $Mo_{1-x}M_xO_{2+y}$ (where M is at least one element selected from the group consisting of Ni, Co, Mn, Fe, Cu, Al, Mg, W, Sc, Ti, Zn, Ga, Ge, Nb, Rh, Pd and Sn, x satisfies the relationship $0.005 \leq x \leq 0.5$, and y satisfies the relationship $0.6 \leq y \leq 1.2$).

The molybdenum metal oxide used, in the form of a thin film, for the positive electrode in accordance with the present invention is represented by the formula $Mo_{1-x}M_xO_{2+y}$, i.e., the molybdenum metal oxide derived via partial substitution of a metal element for Mo in molybdenum oxide. The substituting metal element M is at least one element selected from the group consisting of Ni, Co, Mn, Fe, Cu, Al, Mg, W, Sc, Ti, Zn, Ga, Ge, Nb, Rh, Pd and Sn. The partial substitution of metal element M for Mo increases a bond strength between the metal element and oxygen to thereby improve cycle characteristics. Preferably, the substituting element M is at least one element selected from the group consisting of Ni, Co, Mn, Fe, Al, Mg, W and Ti.

In the above-specified formula, x is a stoichiometric value of the substituting element M and satisfies the relationship $0.005 \leq x \leq 0.5$, preferably $0.01 \leq x \leq 0.3$. If the value of x falls outside the specified range, the sufficient improvement in cycle characteristics, which is an effect of the present invention, may not be obtained.

In the above-specified formula, y indicates a variation in stoichiometry of oxygen and satisfies the relationship $0.6 \leq y \leq 1.2$. If y is maintained at a value within this range, nonaqueous electrolyte rechargeable batteries result having improved capacities and energy densities.

A substrate surface over which the molybdenum metal oxide thin film is to be deposited contains aluminum and specifically comprises an aluminum metal or aluminum alloy. Preferably, the thin film may be deposited on the substrate by using a thin film-forming technique such as a CVD, sputtering, vacuum deposition, spraying process or the like.

In the present invention, the substrate preferably serves as a current collector for an electrode. Also, the substrate surface over which the molybdenum metal oxide thin film is to be deposited preferably has a surface roughness Ra in the range of 0.001–1 μm. If the substrate having such a surface roughness Ra is used, the substrate serving as a current collector can maintain good adhesion to the molybdenum metal oxide thin film even during its expansion or shrinkage on charge-discharge cycling and thus collect current efficiently. The surface roughness Ra is defined by Japan Industrial Standards (JIS B 0601-1994) and can be determined as by a surface roughness meter.

In the present invention, the surface roughness Ra of the substrate preferably satisfies the relationship Ra≦t, where t is a thickness of the molybdenum metal oxide thin film.

Also in the present invention, the surface roughness Ra of the substrate preferably satisfies the relationship S≦100Ra, where S is an average interval of peaks in surface irregularities. The average peak interval S is also defined by Japan Industrial Standards (JIS B 0601-1994) and can also be determined as by a surface roughness meter.

In the present invention, the surface roughness Ra of the substrate is more preferably in the range of 0.0105 μm and greater, still more preferably in the range of 0.011–0.1 μm, still more preferably in the range of 0.012–0.09 μm. The use of the substrate having a surface roughness Ra within the above-specified range enables structural control of the molybdenum metal oxide thin film deposited thereon, resulting in the formation of an electrode which exhibits improved cycle characteristics. That is, by depositing the molybdenum metal oxide thin film on the substrate roughened at its surface to the specified surface roughness Ra, the structure of the molybdenum metal oxide thin film can be rendered into such a form that enhances its adhesion to the substrate as a current collector.

DESCRIPTION OF THE PREFERRED EXAMPLES

The present invention is now described in more detail with reference to preferred examples. It will be recognized that the following examples merely illustrate the practice of the present invention but are not intended to be limiting thereof. Suitable changes and modifications can be effected without departing from the scope of the present invention.

Example 1

Fabrication of Positive Electrode

A rolled aluminum foil roughened at its surface with a # 4000 sand paper to a thickness of 20 $\mu$m and a surface roughness Ra of 0.0128 $\mu$m was used as a substrate. A complex oxide of Mo and Mn was then sputter deposited, in the form of a thin film, onto the substrate. The thin film deposition was accompanied by activation of oxygen in the sputtering gas and surface reactions.

Specifically, an Ar gas and $O_2$ gas for sputtering were introduced into an ECR plasma source at respective flow rates of 100 and 20 sccm (standard cubic centimeters per minute). The ECR plasma was generated by the application of a microwave power and magnetic field and then exposed to the aluminum foil substrate. Also, a radio-frequency power was applied to a sputter source encompassing a target comprised of a mixture of $MoO_3$ and $Mn_2O_3$ to produce a plasma between the substrate and target. The target was sputtered by this plasma, so that a complex oxide of Mo and Mn was deposited, in the form of a thin film, onto the substrate. Details of the thin film-forming conditions are listed in Table 1. The complex oxide thin film deposited was found to be about 1.5 $\mu$m thick.

TABLE 1

| | During Film Formation |
|---|---|
| Ar Gas Flow | 100 sccm |
| $O_2$ Gas Flow | 20 sccm |
| Reaction Pressure | 0.1 Pa |
| Radio-Frequency | 350 W |
| Microwave Power | 200 W |
| Substrate Temp. | Heat Unapplied (Temp. Uncontrolled) |
| Target Material | $MoO_3$, $Mn_2O_3$ |

The thin-film complex oxide was determined to have a composition of $Mo_{0.86}Mn_{0.14}O_3$.

A combination of this thin film and the aluminum thin film was cut into a specific size to provide a positive electrode a-1.

Preparation of Electrolyte Solution 1 mole/l of $LiPF_6$ was allowed to dissolve in a mixed solvent containing ethylene carbonate and diethyl carbonate in the ratio by volume of 4:6 to prepare an electrolyte solution.

Construction of Beaker Cell

Figure 3:
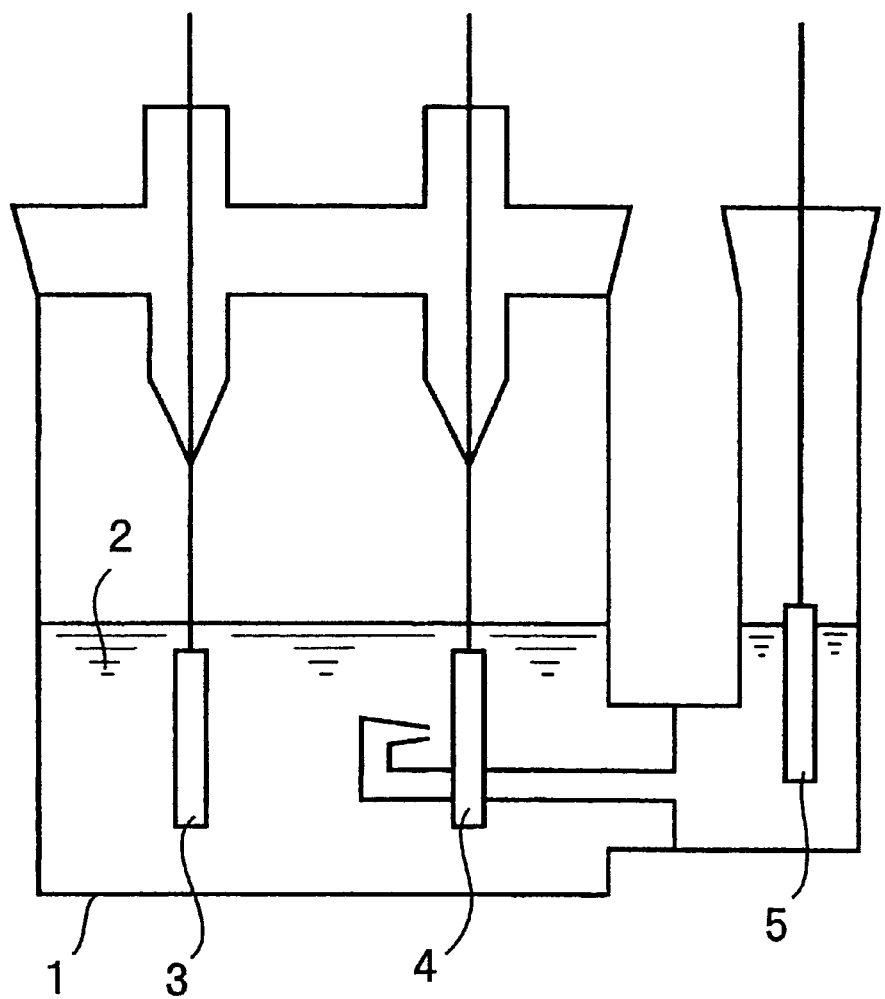
FIG. 3 is a diagramatic sectional view of a beaker cell fabricated in an example.

A beaker cell shown in FIG. 3 was constructed using the above-fabricated positive electrode as a work electrode. As shown in FIG. 3, the beaker cell was constructed by immersing the work electrode 4, a counterelectrode 3 and a reference electrode 5 in an electrolyte solution 2 located inside a container 1. The above-prepared electrolyte solution was used for the electrolyte solution 2 and metallic lithium was used for both the counterelectrode 3 and reference electrode 5.

Comparative Example 1

The procedure of Example 1 was followed, except that $MoO_3$ was used as a target, to deposit a thin film of molybdenum metal oxide on an aluminum foil. The molybdenum metal oxide thin film deposited was about 2 $\mu$m thick.

The resulting oxide thin film was cut into the specific size in the same manner as in Example 1 to provide a positive electrode b-1. The procedure of Example 1 was followed, except that the positive electrode b-1 was used in place of the positive electrode a-1, to construct a beaker cell.

Charge-discharge Performance Test

Each of the beaker cells constructed in the manners as described above was discharged at a constant current of 0.2 mA at 25° C. to 1.5 V (vs. $Li/Li^+$). Subsequently, each cell was charged at a constant current of 0.2 mA to 3.5 V (vs. $Li/Li^+$), further charged at a constant current of 0.067 mA to 3.5 V (vs. $Li/Li^+$) and then discharged under the same conditions as described above. A discharge capacity then measured was recorded as an initial discharge capacity. Next, the above-specified charge-discharge cycle was repeated 10 times and a ratio of a discharge capacity after each cycle to the initial discharge capacity, i.e., a capacity retention, was determined. The results are given in FIG. 1.

Figure 1:
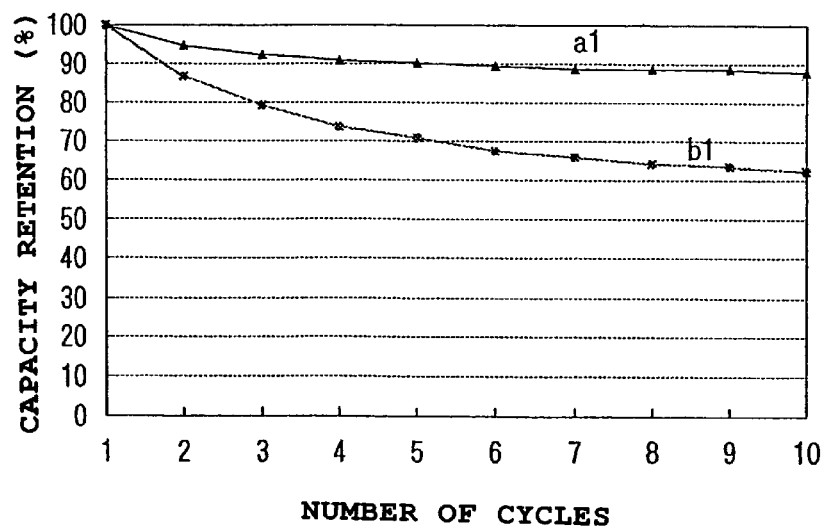
FIG. 1 is a graph showing the charge-discharge test results of examples in accordance with the present invention.

As apparent from FIG. 1, the use of oxide thin films fabricated via partial substitution of Mn for Mo in the Mo oxide for the positive electrode material in accordance with the present invention improves cycle characteristics.

Examples 2–5 and Comparative Example 2

The procedure of Example 1 was repeated, except that the ratio of $MoO_3$ and $Mn_2O_3$ in the target was varied, to deposit a thin film of each complex oxide having a composition specified in Table 2 on an aluminum foil substrate. By using the resulting complex oxide thin films, positive electrodes a-2–a-5 and b-2 were fabricated in the same manner as in Example 1, followed by construction of beaker cells incorporating those positive electrodes. In Table 2, the compositions of complex oxides deposited in Example 1 and Comparative Example 1 are also shown.

TABLE 2

| | Positive Electrode | Composition of Active Materials |
|---|---|---|
| Comp. Ex. 1 | b1 | $MoO_{3.0}$ |
| Ex. 2 | a2 | $Mo_{0.995}Mn_{0.005}O_{3.0}$ |
| Ex. 3 | a3 | $Mo_{0.99}Mn_{0.01}O_{3.0}$ |
| Ex. 1 | a1 | $Mo_{0.86}Mn_{0.14}O_{3.0}$ |
| Ex. 4 | a4 | $Mo_{0.71}Mn_{0.29}O_{3.0}$ |
| Ex. 5 | a5 | $Mo_{0.5}Mn_{0.5}O_{3.0}$ |
| Comp. Ex. 2 | b2 | $Mo_{0.46}Mn_{0.54}O_{3.0}$ |

Charge-discharge Performance Test

Figure 2:
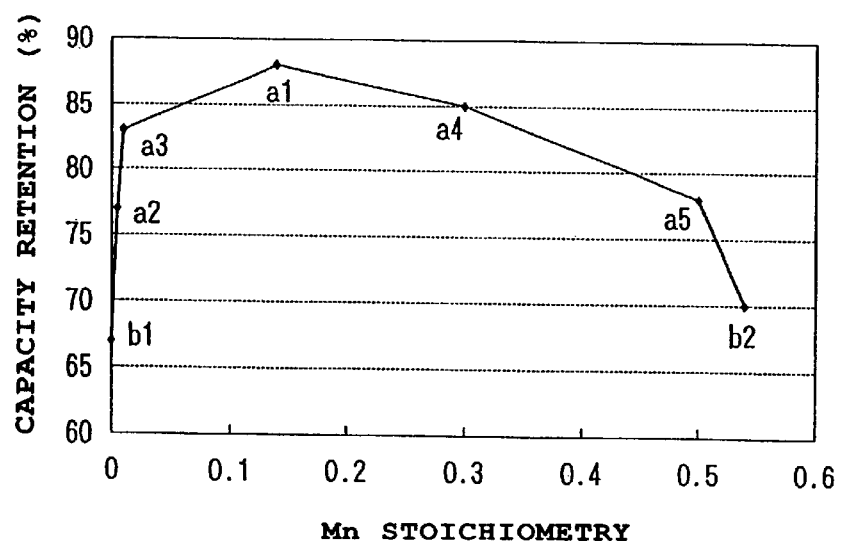
FIG. 2 is another graph showing the charge-discharge test results of examples in accordance with the present invention.

The beaker cells constructed in the manner as described above were cycled ten times under the same conditions as in the charge-discharge performance test conducted for the beaker cells of Example 1 and Comparative Example 1, and then evaluated for capacity retention after 10 cycles. The results are given in FIG. 2. In FIG. 2, the results obtained for Example 1 and Comparative Example 1 are also indicated.

As can be appreciated from the results shown in FIG. 2, Examples 2 through 5, i.e., beaker cells using the positive electrodes a-2 through a-5, exhibit high capacity retention levels. The data demonstrates that the improved cycle characteristics are obtained when the molybdenum metal oxide thin film has a composition represented by $Mo_{1-x}M_xO_{2+y}$ ($0.005 \leq x \leq 0.5$ and $0.6 \leq y \leq 1.2$). This is believed due to the followings. If the amount of Mn substitution or Mn stoichiometry falls below the specified range, the effect of substitution is not increased to a sufficient level. On the other hand, if it exceeds the specified range, the existing state of each atom in the oxide changes. As can be seen from FIG. 2, the cycle characteristics are further improved when the composition is represented by $Mo_{1-x}M_xO_{2+y}$ ($0.01 \leq x \leq 0.3$ and $0.6 \leq y \leq 1.2$).

In accordance with the present invention, nonaqueous electrolyte rechargeable batteries can be provided which have high capacity and energy density and which exhibit excellent cycle performance characteristics.

What is claimed is:

1. A nonaqueous electrolyte rechargeable battery including a positive electrode, a negative electrode and a nonaqueous electrolyte; said positive electrode comprising a molybdenum metal oxide deposited, in the form of a thin film by CVD, sputtering, vacuum deposition, or spraying process, on an aluminum-containing substrate and represented by the formula $Mo_{1-x}M_xO_{2+y}$ where M is at least one element selected from the group consisting of Ni, Co, Mn, Fe, Cu, Al, Mg, W, Sc, Ti, Zn, Ga, Ge, Nb, Rh, Pd and Sn, x satisfies the relationship $0.005 \leq x \leq 0.5$, and y satisfies the relationship $0.6 \leq y \leq 1.2$; and wherein said substrate has a surface roughness Ra in the range of 0.001 μm or greater.

2. The rechargeable battery of claim 1, wherein x in the formula $Mo_{1-x}M_xO_{2+y}$ satisfies the relationship $0.01 \leq x \leq 0.3$.

3. The rechargeable battery of claim 1, wherein M in the formula $Mo_{1-x}M_xO_{2+y}$ is at least one element selected from the group consisting of Ni, Co, Mn, Fe, Al, Mg, W and Ti.

4. The rechargeable battery of claim 1, wherein M in the formula $Mo_{1-x}M_xO_{2+y}$ is Mn.

5. The rechargeable battery of claim 1, wherein said substrate has a surface roughness Ra in the range of 0.001–1 μm.

6. The rechargeable battery of claim 1, wherein the surface roughness Ra of said substrate satisfies the relationship Ra<t, where t is a thickness of said molybdenum metal oxide thin film.

7. The rechargeable battery of claim 1, wherein a surface roughness Ra of said substrate satisfies the relationship $S \leq 100Ra$, where S is an average interval of peaks in surface irregularities.

8. The rechargeable battery of claim 1, wherein a surface roughness Ra of said substrate is 0.0105 μm or greater.

9. The rechargeable battery of claim 1, wherein a surface roughness Ra of said substrate is in the range of 0.011–0.1 μm.

10. The rechargeable battery of claim 1, wherein a surface roughness Ra of said substrate is in the range of 0.012–0.09 μm.

11. The rechargeable battery of claim 1, wherein said substrate comprises an aluminum foil.

* * * * *